Nov. 17, 1970 HIROSHI GENCHI ET AL 3,541,511

APPARATUS FOR RECOGNISING A PATTERN

Filed Oct. 26, 1967 12 Sheets-Sheet 1

KENICHI MORI
SADAKAZU WATANABE
HIROSHI GENCHI, &
BY SUMIO KASURAGI,
INVENTORS by Stephen H. Frishauf
Atty Nov. 17, 1970 HIROSHI GENCHI ET AL 3,541,511

APPARATUS FOR RECOGNISING A PATTERN

Filed Oct. 26, 1967 12 Sheets-Sheet 2

FIG. 5
| PRIMARY PARTIAL CHARACTERISTIC PATTERN | CONTENTS | CLASSFICATION NUMBER | SYMBOL |
|---|---|---|---|
| 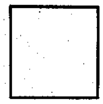 | NO LINE SEGMENT | 0 | |
| 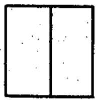 | VERTICAL LINE | 1 | V |
| 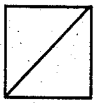 | POSITIVE OBLIQUE LINE | 2 | I |
| 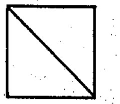 | NEGATIVE OBLIQUE LINE | 3 | D |
| 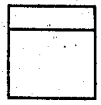 | UPPER HORIZONTAL LINE | 4 | H |
| 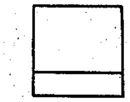 | LOWER HORIZONTAL LINE | 5 | L |
| 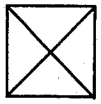 | OTHERS | 6 | * |

FIG. 7

| SECONDARY PARTIAL CHARACTERISTIC PATTERN | CONTENTS | SYMBOL | SECONDARY PARTIAL CHARACTERISTIC PATTERN | CONTENTS | SYMBOL |
|---|---|---|---|---|---|
| 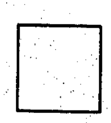 | NO PARTIAL PATTERN | | 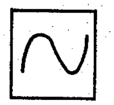 | CURVES LIKE | M |
| 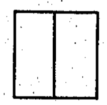 | VERTICAL LINE | VERT | 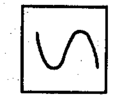 | CURVES LIKE | W |
| 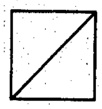 | POSITIVE OBLIQUE LINE | INC | 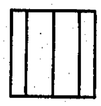 | THREE PARALLEL VERTICAL LINES | T |
| 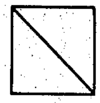 | NEGATIVE OBLIQUE LINE | DEC | 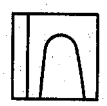 | PATTERNS LIKE | VRTC |
| 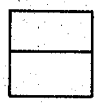 | HORIZONTAL LINE | BAR | 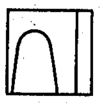 | PATTERNS LIKE | CVRT |
| 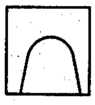 | CURVE CONVEX UP WARD | CAP | 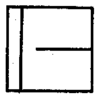 | PATTERNS LIKE | VBAR |
| 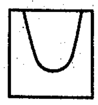 | CURVE CONVEX DOWN WARD | CUP | 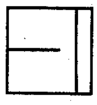 | PATTERNS LIKE | BARV |
| 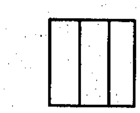 | TWO PARALLEL VERTICAL LINES | PALL | 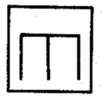 | CURVES LIKE | DUBLE |

United States Patent Office 3,541,511
Patented Nov. 17, 1970

3,541,511

APPARATUS FOR RECOGNISING A PATTERN

Hiroshi Genchi and Sadakazu Watanabe, Tokyo, and Kenichi Mori and Sumio Katsuragi, Yokohama-shi, Japan, assignors to Tokyo Shibaura Electric Co., Ltd., Kawasaki-shi, Japan, a corporation of Japan Filed Oct. 26, 1967, Ser. No. 678,427
Claims priority, application Japan, Oct. 31, 1966, 41/71,516, 41/71,517, 41/71,613
Int. Cl. G06k 9/00
U.S. Cl. 340—146.3 12 Claims

ABSTRACT OF THE DISCLOSURE

A pattern recognising apparatus comprising means including a quantizer for converting an electrical signal corresponding to an original pattern to be recognised into a mesh pattern, means for dividing the mesh pattern into a plurality of channels, means for detecting primary, secondary and tertiary partial characteristics of the mesh pattern, means for determining the channel characteristic of each channel from the combination of the tertiary partial characteristic and secondary partial characteristic, means responsive to the sequential order of the channel characteristics of the channels for identifying the original pattern.

This invention relates to a pattern recognising apparatus, especially to a pattern recognising apparatus suitable for reading handwritten characters.

Character recognition system use methods roughly classified as a correlation method or a characteristic extraction method. Various methods have been employed in the characteristic extraction method, such as (a) a detector wherein several conductive lines that operate as detectors are provided, their intersections with the character are checked, and the character is identified by a combination of these intersections, (b) a method in which the terminal points, bending points, branching points, loops and isolated points etc. are regarded as parameters, their presence or absence and the directivities thereof are detected, and from the arrangement of these parameter groups, the unknown character is identified, and (c) a method in which the shapes of the pattern viewed from specified directions are made characteristic parameters, that is, the pattern characteristics obtained by viewing the character from four directions are considered to be defined effectively by Fourier analysis or by differentiating the shape of the boundary, and the coefficients are used as the parameters for identifying the unknown character.

The detector method (a) has a comparatively large identifying capacity with respect to variations in the size, shape, position, and inclination of a character. It is useless, however, when the character, especially a handwritten character, has parameters rich in change and deformation due to difficulties in providing adequate detectors.

The system (b) wherein characteristics are made parameters is considered effective not only to typewritten characters but also to handwritten characters. However, in the conventional methods belonging to this system, an unknown character is identified by using only the sequence of the parameter group obtained by observing the character from above or from the left. For example, the pattern of a character is divided into several zones, characteristic parameters for each zone are determined, then the character is identified based on the sequence of these parameter groups. In this system, however, the relationships between the characteristic parameters of each zone, that is, the connections between characteristic parameters are unknown and are insufficient to identify a two dimensional pattern.

The system (c), wherein the shapes of a pattern viewed from specified directions are made special parameters, the differences in the thickness and inclination are expressed by the fluctuations of the output waveform and the difference in the positions on the time axis, regardless of the location of the character. Therefore, if the information on the time axis is not used in identification the result obtained has no relation to the size of the character. However, this system has a drawback of being impracticable when the number of characters is great as in the case of handwriten characters since the output waveforms are hard to deal with.

Consequently a system capable of satisfactorily reading characters automatically, especially figures handwritten with pencil, fountain pen, ball point pen, signature pen has not yet been developed.

Moreover, the original pattern such as letters and symbols which are the objects of pattern recognising devices have various indefinite elements such as shapes, sizes, thickness, stains, positions and inclination. This requires various preliminary treatment during converting processes in which the original patterns are read and converted into input patterns suitable for recognising devices, and these input patterns are converted into normalised patterns or its component patterns required to extract parameters needed for pattern recognition.

Normally the input section of a pattern recognising device has a fixed position and size whereon the scanned input pattern is read in, its position, shape, size, and scanning speed having been controlled. Although it is very difficult to bring a pattern such as a character to the predetermined position of the input section and to place the pattern into the predetermined area, it is an important problem in practical use. The following counter-measures are normally considered. One method is to set limits on the original pattern in order to avoid preliminary treatment operations for position and size. For example, the method wherein the objectives of recognition are limited to special type characters that have uniform sizes and thickness, and only specified kind of characters (for example, figures alone) are read in.

However, since this method drastically limits the number of original patterns, its use is limited.

Another method is to determine the position and size of an original pattern by performing preliminary sensing or scanning, then to scan the pattern again. In the ERA (Electronic Reading Automation) system of Solartron, the center of a pattern is determined by sensing the upper, lower, right, and left limits of a pattern in the first scanning, the origin of coordinates is moved to that position, and the pattern is read in by the second scanning. This method is capable of obtaining an input pattern suited to the treatment that follows. However, it takes two scanning operations which is inconvenient in operation.

Another method that can be considered is to widen previously the input section of the pattern recognising device so that the pattern to be read in will be placed somewhere within the range. The input section consists of a shift register which functions to move the pattern to a predetermined position after reading it in.

This method has a drawback of considerably complicating the construction and operation of the device since the control of pattern size is insufficient and internal computation is required in order to perform preliminary treatment of the pattern.

The purpose of this invention is to provide a pattern recognising apparatus capable of satisfactorily recognising handwritten characters as recognition of them has been almost impossible by conventional recognising devices.

A further object of the invention is to provide a pattern recognising device that has a higher capability of pattern recognition the input to the characteristic detecting means is moralised so that the input will be most suited to the detection of characteristic parameters.

SUMMARY OF THE INVENTION

According to the present invention, a pattern recognising apparatus comprises means including a quantising means for converting the pattern to be recognised into mesh patterns, preliminary treatment means receiving the mesh patterns for detecting the position of the quantised pattern and for segmenting the detected pattern, means for dividing the preliminarily treated mesh pattern into a plural number of channels, means for detecting a primary partial characteristic for each channel, means for detecting a secondary partial characteristic of the pattern from the sequential order of the primary partial characteristic, means for detecting a tertiary partial characteristic by relating the secondary characteristic of a channel to the secondary charcteristics of the immediately preceding and succeeding channels, means for determining the channel characteristic of each channel by combining the tertiary partial characteristic and secondary partial characteristic for each respective channel, and means responsive to the seqential order of said channel characteristics for identifying the original pattern to be recognised.

Embodiments of the invention will now be described, by way of example only, with reference to the accompanying drawings, in which;

FIG. 5 illustrates an example of the partial pattern set as the primary partial characteristic;

FIG. 7 is a table of the secondary partial characteristics;

Figure 1:
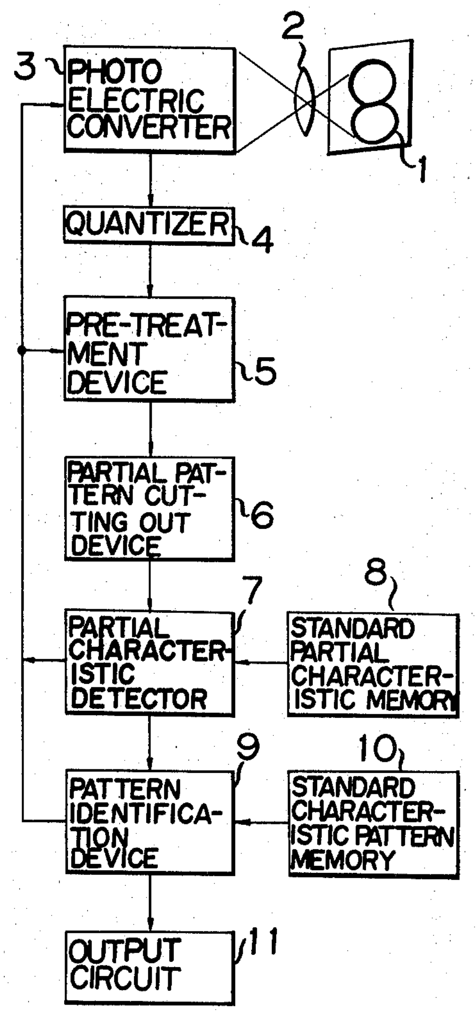
FIG. 1 is a block diagram of a pattern recognising apparatus to which the invention is applied.
Figure 3:
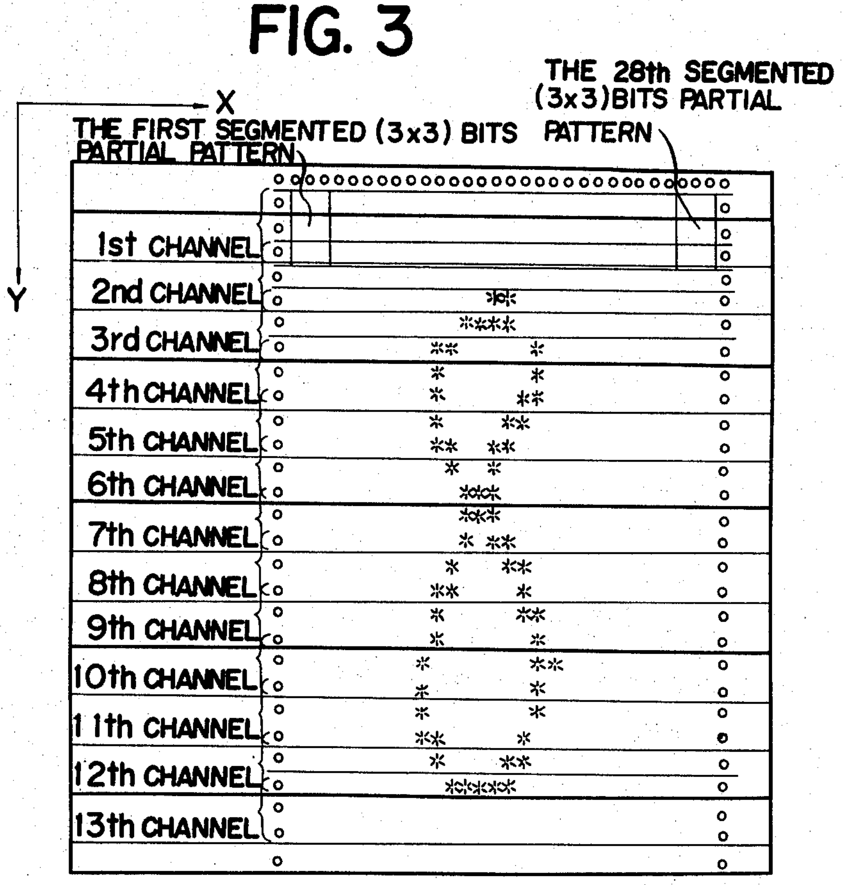
FIG. 3 illustrates an explanatory diagram that explains the operation of the partial pattern cutting out circuit contained in FIG. 1.
Figures 9A, 9B, 10A, 10B:
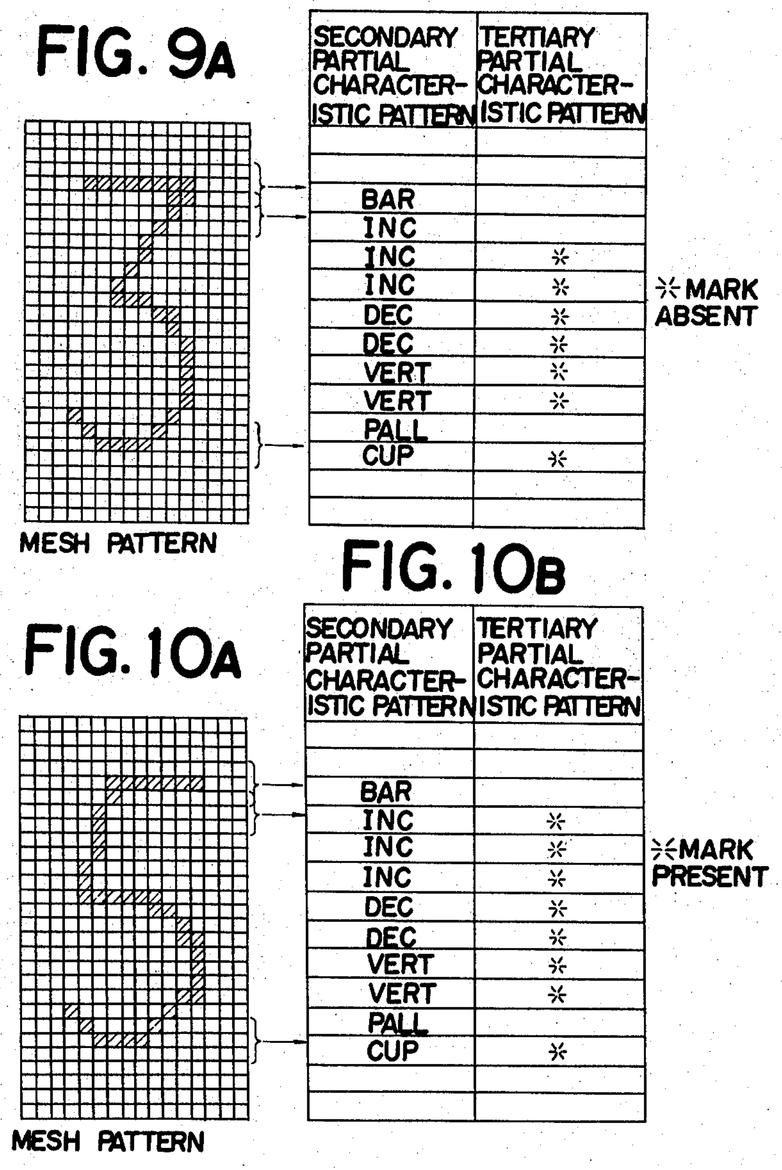
Figure 11:
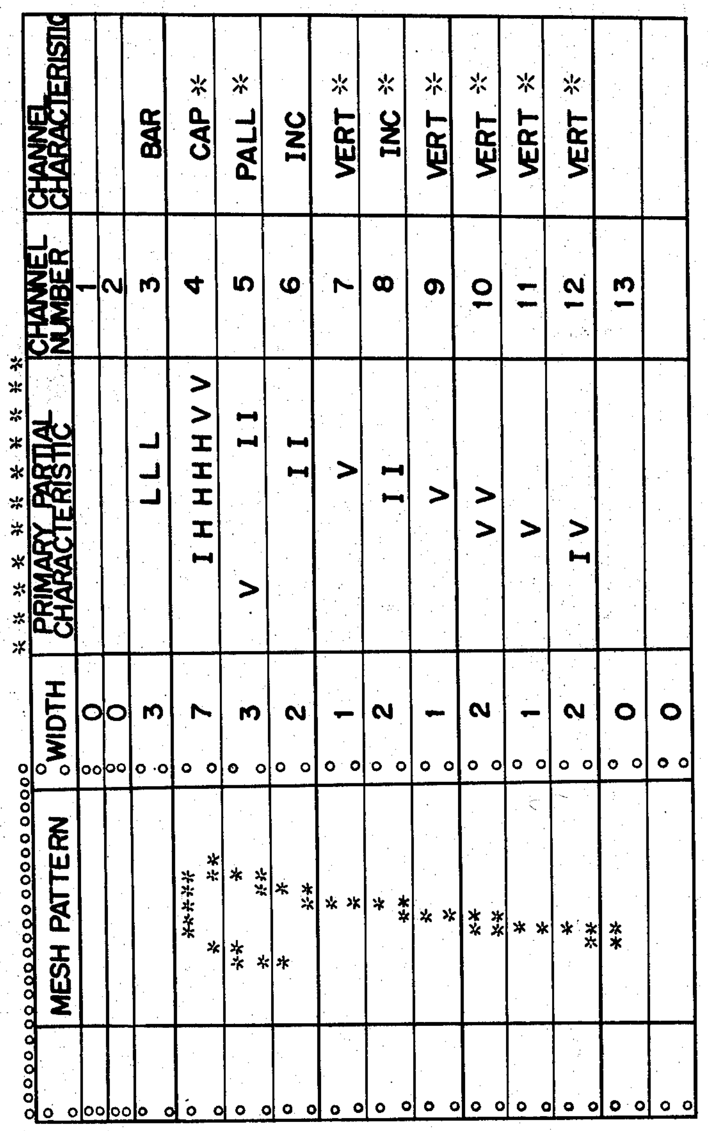
Figure 12:
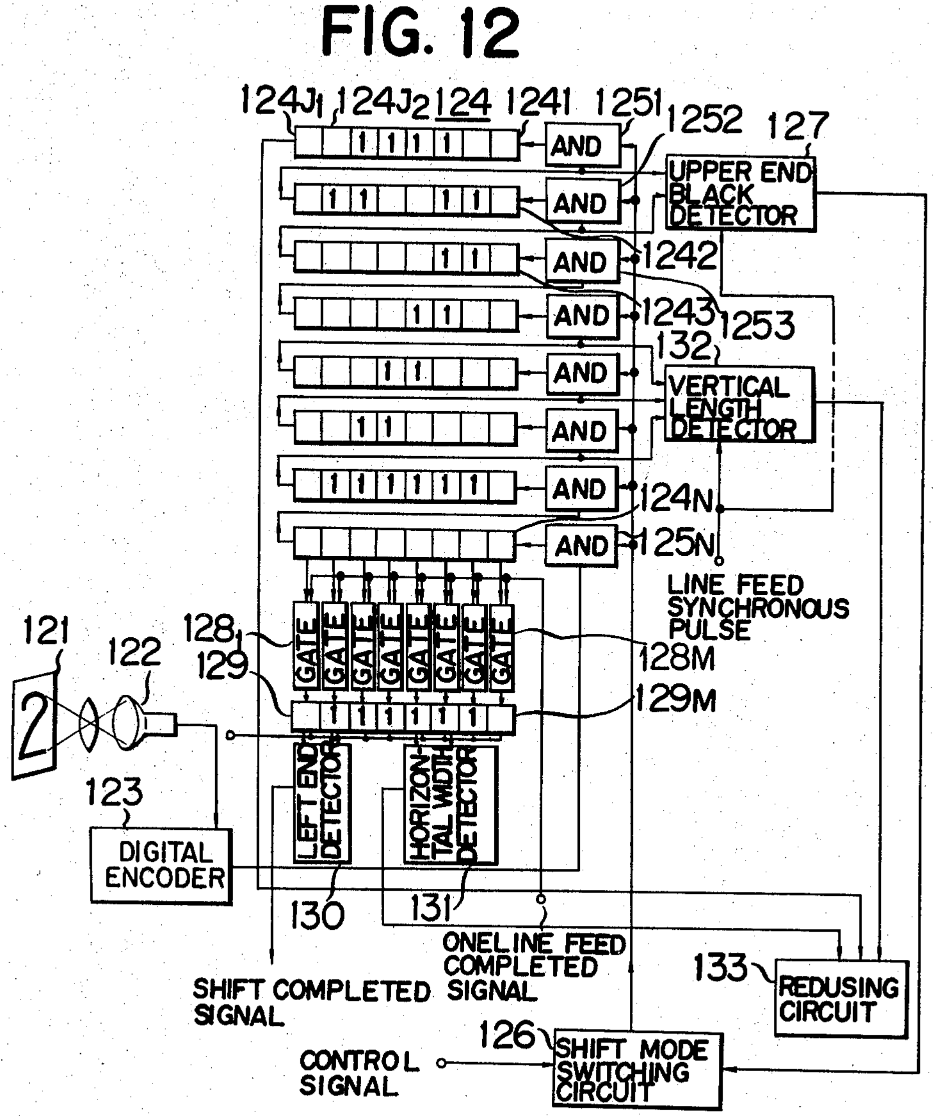
Figure 13:
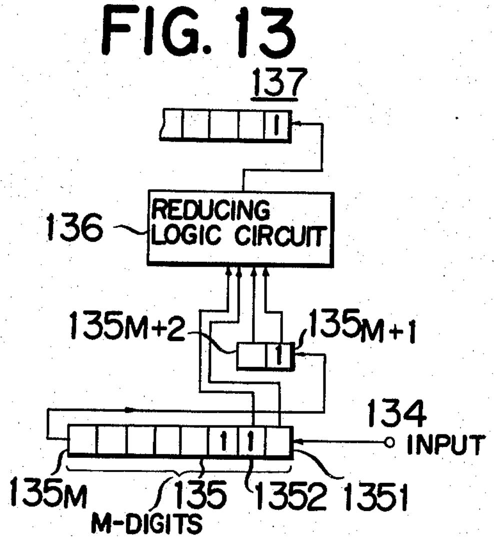
Figure 14A:
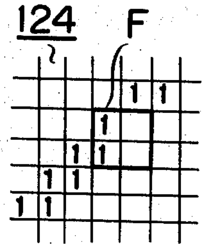
Figure 14B:
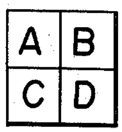

FIGS. 9*a* and 10*a* show the mesh patterns of handwritten FIGS. 3 and 5, respectively;

FIGS. 9*b* and 10*b* show the secondary and tertiary characteristics of the handwritten FIGS. 3 and 5, respectively;

FIG. 11 shows an example of reading of handwritten pattern 7 read through an embodiment of the invention;

FIG. 12 illustrates, in block diagram form, another example of the primary treatment circuit shown in FIG. 1;

FIG. 13 illustrates, in detailed block diagram form, the pattern reducing circuit shown in FIG. 12; and FIGS. 14*a* and 14*b* are views that explain the apparatus shown in FIG. 13.

One embodiment of the present invention will be explained in detail with reference to FIG. 1. An original pattern 1 e.g. the numeral 8 to be recognised is written on a sheet of paper with pencil, fountain pen, ball point pen, or signature pen.

The original pattern 1 is scanned sequentially by a well-known photoelectric converting device 3 through an optical system 2 and is converted into electrical signals.

As the photoelectric converting device 3, such well-known devices as solar battery can be used. The electric signals thus obtained are applied to a quantising circuit 4 to be quantised and are then applied to a preliminary treatment circuit 5 through a noise removing circuit (not shown) when required.

Figure 2:
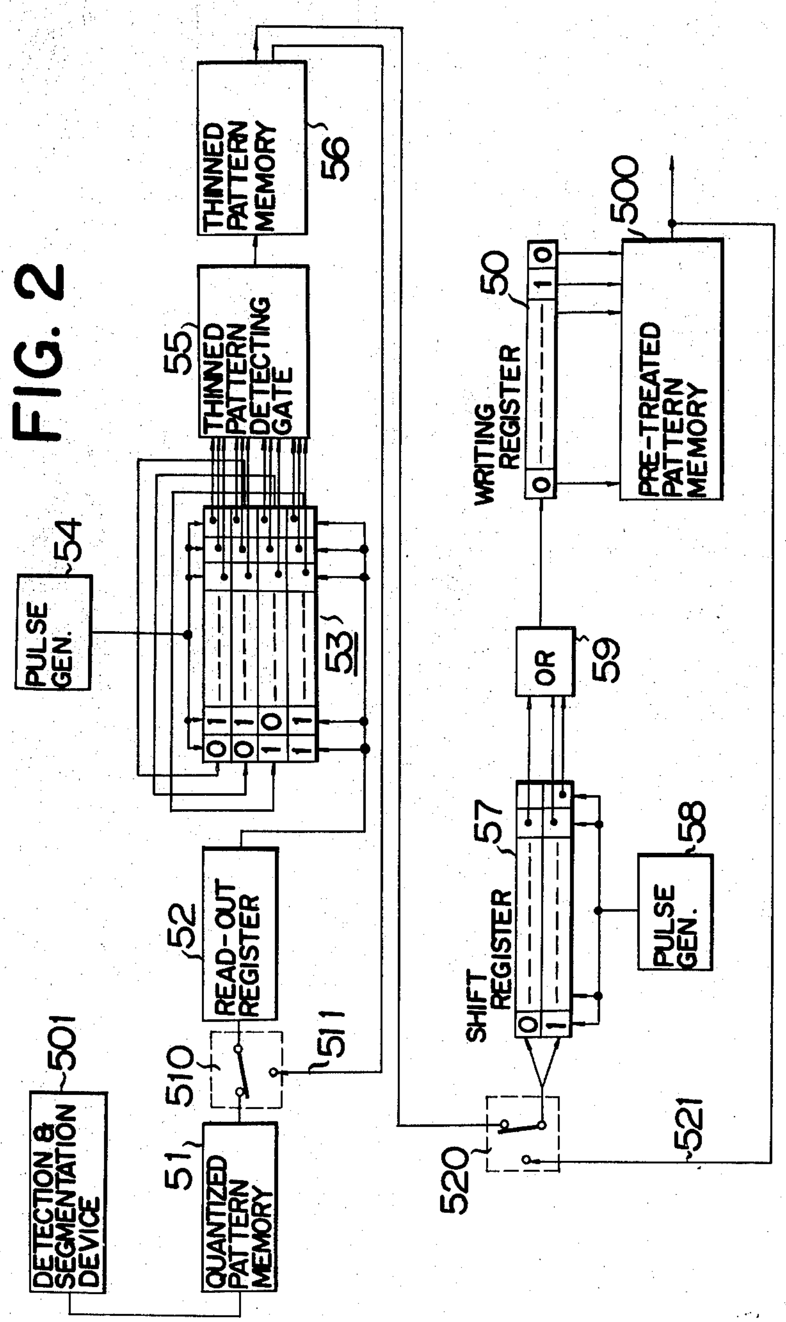
FIG. 2 illustrates, in block diagram form, a preliminary treatment circuit comprising one component of the apparatus of FIG. 1.

The preliminary treatment circuit 5 performs such preliminary treatment as detecting the position of the quantised pattern, segmenting the detected pattern, and enlarging or reducing the pattern so that the input signals will be best suited for the apparatus, and is constructed, for example, as shown in FIG. 2 wherein the input pattern is thinned and reduced. The quantised electrical signal is first applied to the quantised pattern memory device 51 from the noise removing circuit via a well known detection and segmentation device 501 which detects the position of the quantised pattern and segments the detected pattern, and a two dimensional mesh pattern which corresponds to the aforementioned original pattern 1 is memorised in the memory device 51. The memory device 51 has, for example, a memory capacity of (28 x 30) bits.

The memory content of the quantised pattern memory device 51 is read out line by line (each line has 30 bits) to a read out register 52 via a switching device 510, and is then sent to a shift register 53 in sequence.

The shift register 53 consists of 4 lines of 30 bits and accordingly a mesh pattern consisting of 4 x 30 bits is stored in the shift register 53.

The shift register 53 is supplied with shift pulses from a shift pulse source 54 and each time a shift pulse is supplied the memory content is shifted by one bit to the right as illustrated.

The (4 x 3) bits pattern illustrated at the right end is transferred to a thinned pattern extracting gate 55, and when this transfer is completed, a pulse is applied from the shift pulse source, and each pattern stored in the shift register 53 is shifted sequentially by one bit to the right.

In this manner when the mesh pattern of 4 x 30 bits has completely been transferred to the thinned pattern extracting circuit 55 line shift by 4 lines is performed i.e. the shift register 53 is refilled. The line shift is performed in such a way that one line of the pattern (30 bits) is written into the lowermost line of the shift register by the read out register 52 and shifted upwardly. This is repeated until the shift register is refilled.

The digital output (1 or 0) of the aforementioned thinned pattern extracting gate 55 is determined depending on the 4 x 3 bits mesh pattern transferred from the shift register 53, and an output of 1 or 0 is sent to a thinned pattern memory device 56 every time a 4 x 3 bits mesh pattern is transferred. Consequently the thinned pattern (28 x 30) bits is memorised by the aforementioned thinned pattern memory device 56.

The aforementioned thinning operation is performed when the original pattern 1 is a thick letter. Two lines of partial thinned pattern (2 x 30) bits are read out into a shift register 57 from the aforementioned thinned pattern memory device 56, then the three bits pattern indicated on the right end of the aforementioned shift register 57 is transferred to an OR circuit 59. When this transfer is completed, the pattern is shifted by one bit to the right by the action of a shift pulse originating in a shift pulse source 58. When the transfer of partial thinned pattern of 2 x 30 bits has been completed in this way, the next 2 x 30 bits partial pattern is read out from the thinned pattern memory device 56 through a switching device 520 into the shift register 57. One portion of the output of the aforementioned memory device 56 is applied to one of the fixed terminals of the aforementioned switching device 510 through a feed back loop 511.

The output of the aforementioned OR circuit 59 is stored in a 30 bits write register 50 and, for every 30 bits output from the OR circuit 59, in other words every time the aforementioned partial thinned pattern of 2 x 30 bits has been completely transferred to the OR circuit 59, said pattern has been reduced in size and is stored in a preliminary treated pattern memory device 500. The input information processed by the preliminary treatment circuit 5 is supplied to a partial pattern cutting out circuit 6 (FIG. 1) from the preliminary treated pattern memory device 500 with simultaneous application of one portion of the information to one of the fixed contacts of the switching device 520 thrugh a feedback loop 521.

The circuit 6 cuts out for example, a partial pattern of 3 x 31 bits from the aforementioned 28 x 30 bits mesh pattern and applies it to a partial characteristic detecting circuit 7. The cutting out operation of 3 x 3 bits mesh pattern will now be described in detail referring to FIG. 3. The mesh pattern memorised by the preliminary treated pattern memory device 500 is divided into 13 channels each of which consists of three bits in the direction of *y* axis, and named 1st to 13th channel downward from above, corresponding to the original pattern (FIG. 3).

The first channel of such a mesh pattern is read out by shifting bit by bit sequentially 3 x 3 bits partial patterns in the direction of *x* axis starting from the upper left three bits and each partial pattern is applied to the partial characteristic detector 7. When the first channel has been read out, the second channel is read out and so forth.

Figure 4:
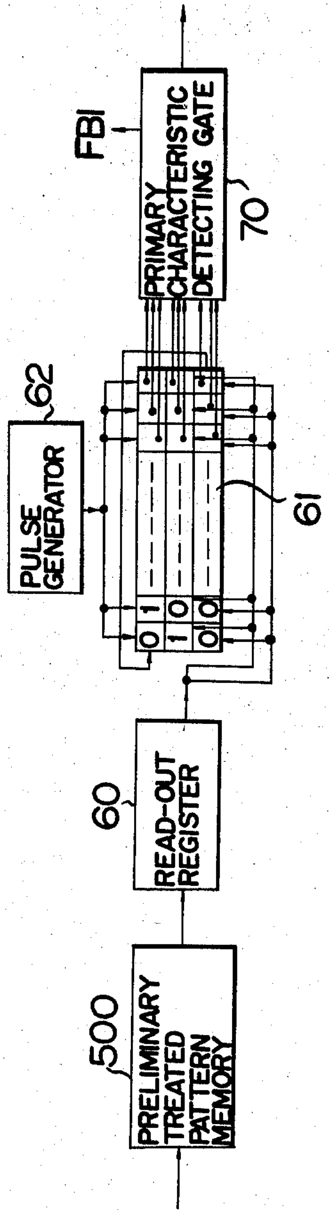
FIG. 4 illustrates, in block diagram form, an example of the partial pattern cutting out circuit of FIG. 1.

The partial pattern cutting out circuit 6 consists of a read register 60 (FIG. 4) which stores and reads out the memory content of the preliminary treated pattern memory device 500, a channel shift register 61 which stores the signal from the read register 60, a shift pulse source 62 which shifts the channel register 61. In detail, the 3 x 30 bits comprising the aforementioned first channel are read out and stored in the channel shift register 61, and a 3 x 3 bits partial pattern of the first channel is applied to a primary characteristic detecting gate circuit 70 which is a component of a partial characteristic detecting circuit 7. Next, all the signals in the register 61 are shifted right by one bit and, when this has been repeated 30 times, the contents of the lowermost line are shifted by two lines to the uppermost line and in the empty lower two lines are written the succeeding two lines of pattern 2 x 30 bits from the read register 60.

In this way, the 28 x 30 bits mesh pattern memorised by the preliminary treated pattern memory device 500 is cut out sequentially into partial patterns of 3 x 3 bits and transferred to the primary characteristic detecting gate circuit 70. The primary partial characteristic is determined for example, with seven partial patterns as shown in FIG. 5. The contents of the 3 x 3 bits partial pattern are divided into seven primary partial characteristics of "no-line segment," "vertical line," "positive oblique line," "negative oblique line," "higher horizontal line," "lower horizontal line," and "identification impossible" and classification numbers 0 to 6 are given to them, respectively. Moreover, symbols "V," "I," "D," "H," "L," "*" are allocated to the classification numbers 1 to 6 respectively and no symbol is allocated to the classification number 0.

Since the primary partial characteristic detecting gate circuit 70 operates as the standard partial characteristic memory 8 of FIG. 1, it is constructed in advance to submit previously set output signals corresponding to each characteristic when a 3 x 3 bits partial pattern that has one of the aforementioned seven primary partial characteristics is sent to it, and the 3 x 3 bits partial pattern is classified into one of the seven primary partial characteristics.

When, in this stage, the pattern 1 is too large for the detection visual field of the photoelectric conversion device 3, the output indicating "identification impossible" is produced by the primary characteristic extracting gate 70. This output is fed back to the feed back input terminal (not shown) of the photoelectric conversion device 3 from the feed back terminal FB1 of the gate 70. For example, the aforementioned feed back signal is applied to the visual field control circuit of the photoelectric comversion device 3 to widen the visual field of the device.

When an image pickup tube is used as the photo-electric conversion device 3 this purpose is achieved by enlarging the scanning range of the electron beam on the photoelectric surface and the aforementioned visual field control is easily performed by controlling the deflection voltages of the image pickup tube.

In this case, since it is easy for a man skilled in the art to vary the deflection voltage corresponding to the feedback signal and it is sufficient to employ well-known means for this purpose, no detailed description will be given here.

In this way, the pattern 1 undergoes photoelectric conversion by the photoelectric conversion device 3 in an adequate state.

When the pattern thinning and reducing operation described with FIG. 2 is inadequate, the "identification impossible" output is also sent out from the primary characteristic extracting gate 70. This output is applied to the switching device 510 or 520 that appears in FIG. 2 and changes over the moving contact of the aforementioned switching device 510 or 520 to the side of the feedback loop 511 or 521. By this operation the output of the thinned pattern memory device 56 or processed pattern memory device 500 is fed back through the switching device 510 or 520 and undergoes the thinning or reducing operation again.

The device is constructed so that the thinning operation and the reducing operation are not performed simultaneously but sequentially.

Figure 6:
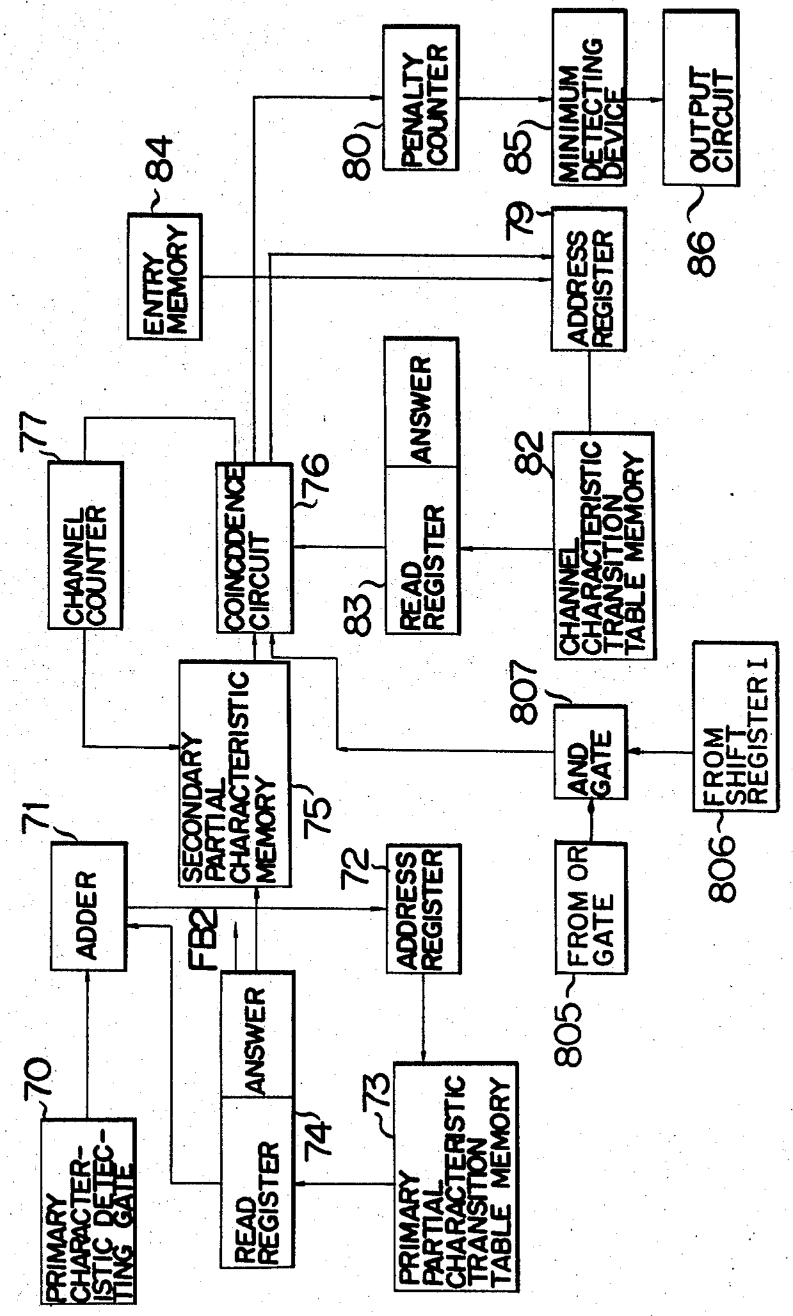
FIG. 6 illustrates, in detailed block diagram form, the section that detects the secondary channel characteristics from the primary partial characteristics and combines the secondary and tertiary characteristics to get the channel characteristics.

The operation of detecting the secondary and tertiary partial characteristics and channel characteristics from the signals indicating the primary partial characteristic values thus obtained will now be explained with reference to FIG. 6. The signals that express the aforementioned primary partial characteristic values are applied to an adder circuit 71 by the detecting gate 70, added with the signals from a read register 74, and the results are sent to an address register 72. The read register 74 receives the contents of an address designated by an address counter (not shown) from a primary partial characteristic transition table memory device 73 that is a part of the standard partial characteristics memory device 8 shown in FIG. 1. The transition table of the primary partial characteristics is memorised by said memory device 73.

The signals sent to the address register 72 from said added circuit 71 designate the call addresses of the transition table memorised by the memory device 73, and the address register memorises the next call addres of the transition table. The contents of the memory device 73 read out to the read register 74 are divided into an address part and an answer part. The address part is sent to the adder circuit 71 and the answer is memorised by a secondary partial characteristic memory 75 as the secondary partial characteristic. Said secondary partial characteristic is determined as one of the predetermined secondary partial characteristics from the detection of the order of the sequentially obtained primary partial characteristics by scanning the primary partial characteristics in the direction of *x* axis for each channel of FIG. 3. The secondary partial characteristics are classified, for example, into 16 characteristics as shown in FIG. 7. These secondary partial characteristics express the mesh patterns of each channel.

The secondary partial characteristics are defined by the following characteristics, the contents thereof are "no partial pattern," "vertical line," "positive oblique line," "negative oblique line," "horizontal line," "curve convex upward," "curve convex downward," "two parallel vertical lines," "curve having two convex parts on top and bottom, or line formed by connecting a curve which is convex upward or downward with a horizontal line," "three vertical parallel lines," "pattern containing a vertical line and a curve that is convex upward or downward," "pattern that has a vertical and a horizontal line," and "pattern in the form of the letter E or F" turned through a right angle. Said feedback signal to be applied to the photoelectric converter 3 can also be obtained by feeding back the answer output of the read register 74.

Figure 8:
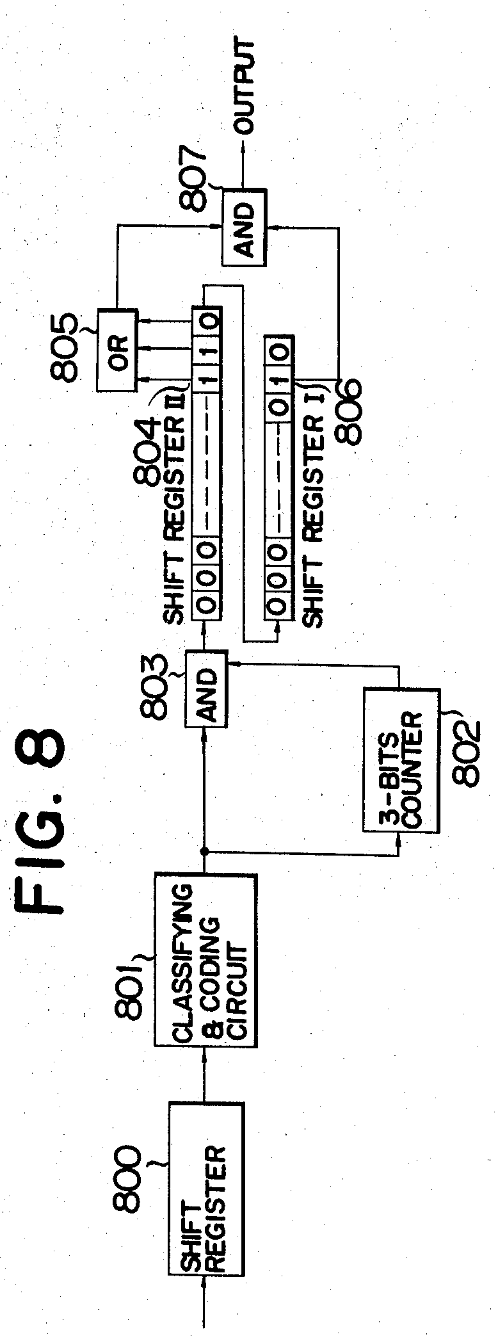
FIG. 8 illustrates, in detailed block diagram form, one example of the said tertiary partial characteristic detecting circuit.

Then the teritary partial characteristics that express the connecting relationship between channels are detected by the tertiary partial characteristic detecting circuit shown in FIG. 8. As will be described later, said circuit relates the secondary partial characteristic that appears on the $p$th channel to the channels that precede and succeed the $p$th channel, that is the $(p-1)$th and $(p+1)$th channels and clarifies the connecting relationships therebetween. A register 800 for the primary partial characteristic values consists of a 30-bits shift register and memorises the sequentially obtained values of the primary partial characteristics, namely the values of classification numbers 0 to 6 shown in FIG. 5 which correspond to the output of the gate 70 of FIG. 4. The values of the primary partial characteristics generated by the register 800 are supplied to a primary secondary partial pattern characteristic classifying and coding circuit 801 which classifies and codes the primary secondary partial characteristics corresponding to their values, for example, outputs "0" when the characteristic value is 0 and outputs "1" when the classification number of the characteristic value is other than 0, namely when it is one of the figures 1 to 6. When the output "1" is generated by the classifying and coding circuit 801, the output is supplied to a three bits counter 802 that detects three or less than three successive "1." However, the counting operation is performed only when the initial output "1" is obtained in the channel being scanned. In other cases, no counting is performed.

The counter 802 generates output "1" only when it counts three or less than three consecutive "1," bits and generates "0" in other cases. Consequently a shift register (II) 804 receives "1" only when the counter 802 is counting three or less than three consecutive "1" and "0" in other cases. The shift register (II) 804 is, for example, a register of 31 bits which shifts the stored bits to right in FIG. 8, the bit at the right being reset to "0" by a channel reset signal. The output from the secondary partial characteristic classifying and coding circuit 801 is recorded bit by bit in the shift register (II) 804 starting from the left end, and shifted right bit by bit synchronised with the detection of secondary partial characteristics.

The right end of the shift register (II) 804 is connected to the left end of a 30-bits shift register (I) 806. Therefore, the secondary partial characteristic classifying and coding value of the channel one step previous to that recorded in the shift register (II) 804 is loaded in the shift register (I) 806. Then the logical sum of the rightmost three bits of the shift register (II) 804 is obtained by an OR circuit 805, and the logical product of the output of the circuit 805 and the second output from the right end of the shift register (I) 806 is obtained by an AND circuit 807 to enable the tertiary partial characteristics to be detected.

The necessity of such tertiary partial characteristics is clear when FIGS. 9A, 9B and 10A, 10B are referred to.

FIG. 9A shows the mesh pattern of the handwritten FIG. 3 and FIG. 10A shows the mesh pattern of the handwritten FIG. 5. FIGS. 9B and 10B are tables that show the secondary and tertiary characteristics thereof, respectively.

The secondary partial characteristic trains are the same for the handwritten FIGS. 3 and 5. The essential difference between these figures lies in the connection relationship of the horizontal bar (BAR) detected in the first channel and the oblique line (INC) obtained from the second channel. In other words, the figure is determined as 3 or 5 depending on whether the oblique line is attached to the left side of the bar or to the right side thereof. In order to make clear distinction between right and left attachments of the oblique line, "*" mark is put on the $(p+1)$th channel as the tertiary partial characteristic when the pattern of the $(p+1)$th channel is connected to the pattern of the $p$th channel at the left end of the pattern. Consequently no "*" mark is put on they are not connected at the left end. Although the presence or absence of connection at the left end of the pattern is explained as an example, it is also possible to use complex connection relationships such as left, right, middle, etc.

Then one of the 16 secondary partial charateristics and tertiary partial characteristic are combined to determine the output of each channel. This output is called "channel characteristic." In short, the channel characteristic is a combination of one of the secondary partial characteristics and the tertiary partial haracteristic. The channel characteristic is always expressed in combined form. Hence the total number of channel characteristics in the foregoing example is $16\times2=32$. When, in like manner, all the channel characteristics have been detected, a channel characteristic train, in which the channel characteristics are arranged in the order of channel numbers, is determined. The input pattern is identified and the result is the output circuit 11 by checking this channel train with the limited number of characteristic trains set previously stored in the standard characteristic pattern memory device 10 of FIG. 1 using the pattern identification device.

The operation to identify said channel characteristics based on the secondary and tertiary partial characteristics will be described in detail referring to FIG. 6.

The tertiary partial characteristic signals are applied to a coincidence circuit 76 from the AND gate 807 of FIG. 8. The coincidence circuit 76 sends the address part of the contents of the memory device 73 to an address register 79 only when the channel characteristic determined by the secondary partial characteristic signal from the secondary partial characteristic memory device 75 and by the tertiary partial characteristic signal coincides with the the characteristic section of the contents of a read register 83 by collation and, when there is no coincidence, adds "1" to the contents of the address register 79. A signal "1" as a penalty signal is added to a penalty counter 80. To the read register 83 are read out the contents of the address of a channel characteristic transistion table memory device 82 designated by the address register 79. The contents consist of a characteristic part, address part, and an answer part, each of which is sent to the coincidence circuit 76. A channel counter 77 counts and records the number of channels. An entry memory device 84 is provided because of the presence of a plural number of transition tables and the output of said device 84 is sent to the address register 79 to designate each initial address of each transition tables. Among the penalty signals counted by the penalty counter 80, the minimum set penalty value is detected by a minimum value detecting device 85 and the symbol of the penalty is taken out as the output of an output circuit 86. It is also possible to use the output of the minimum value detecting device 85 as the feedback signal to be applied to photoelectric converters.

FIG. 11 illustrates an example of reading a handwritten figure "7." The character pattern on the left end is a mesh pattern obtained by quantising the original pattern (figure "7" written in pencil) by means of a photoelectric conversion device. This pattern is scanned sequentially for each channel. The pattern at the primary partial characteristic column in FIG. 11 is produced by outputting the primary partial characteristics (each output is the central positions of (3 x 3) bits of mesh partial patterns).

The letters "L," "I," "H" . . . correspond to the symbols shown in FIG. 5. The symbol shown at the right end is the channel characteristic.

The symbols BAR, CAP, etc. are the secondary partial characteristics and the * mark is the tertiary characteristic. The channel characteristics are the combination of both and are indicated from top downward as BAR, CAP*, PALL*, etc. It should be noted that the channel characteristics of the third channel and sixth channel are BAR and INC, respectively, and have no tertiary partial characteristic mark*. Consequently, this shows that there is no connection relationship between the patterns of the second and third channels and between the patterns of the fifth and sixth channels on the left end of the patterns. It is natural for the patterns of the second and third channels because there is no pattern in the second channel (and the secondary partial characteristic of the second channel is 0).

For the patterns of the fifth and sixth channels this means that the "INC" (positive oblique line) of the sixth channel does not contact with left side line of the "PALL" (parallel lines) detected in the fifth channel. All other channel characteristics have marks showing that the patterns of these channels contact at the left with the patterns of the channels immediately preceding. The channel caracteristics are applied to the pattern identification circuit 9 sequentially in the order of channel numbers and, when they coincide with one of the standard characteristic trains of the pattern "7" which are arranged as BAR–CAP*–PALL*–INC–VERT*–INC*–VERT*–VERT*–VERT–*VERT* the figure "7" is produced as the output.

The pattern is read as has ben described so far. The essential points common to each of the feedback operations aforementioned are that these operations are performed only when the cases in which the input partial pattern cannot be matched sufficiently with the standard pattern, are generated at least $g$ or more than $g$ times ($g \geqq 2$), and the normalising operation is not performed when the case occurs only one time excluding exceptions. This is to avoid an oscillation phenomenon. The value of $g$ is determined on the basis of the nature of the input data. Normally it is 2 to 3.

In short, in the device that employs this invention the input partial pattern is matched with each of $l(=30)$ standard partial patterns previously provided. When the matching is achieved, the partial characteristic is regarded as having been detected, the classification number of the standard partial pattern is sent to the identification circuit 9, and no feedback signal is generated. When the matching fails ($g$ 22 times or more than $g$ times) the input pattern is regarded as being incompletely normalised and the feedback signal is sent out. The feedback signal indicates a requirement for an enlargement, reduction, or parallel shift of the input pattern signal depending on the characteristics of the partial pattern, for example, on the value of area ratio of the partial pattern fields. Various kinds of feedback loops are used in such cases as aforementioned. In conventional methods, normalising operation is performed in advance regardless of the partial characteristic extracting operation or normalising operation is performed after knowing the final output of the identification circuit. In the embodiment which has just been the result of matching of partial characteristics, which is the object of detection, is directly utilised for judging normalising operation, feedback is utilized to extract partial characteristics, and a normalising operation is performed.

FIG. 12 shows another example of preliminary treatment circuit that forms a part of the pattern identifying device that conforms with the present invention. The original pattern is scanned in mesh form by means of a photoelectric converter to obtain pattern signals and these signals are quantised by the quantising circuit and correspond to the light density and to digital signals "1" and "0" are obtained. These pattern signals are stored in a memory device consisting of a great number of memory elements arranged in matrix form so that they correspond to the mesh pattern of the aforementioned original pattern scanning. Then the size of the pattern is detected by the detectors provided on each section of the memory device. The reduction of the pattern is performed by picking up pattern signals of two or more than two mesh areas from the memory device, and by making the logical sum of the black signals of them correspond to one unit of signal.

The composition of the device will be explained hereinafter with reference to the drawings. FIG. 12 is a block diagram of the section of the device embodying this invention and which performs pattern scanning and pattern size detection. A pattern 121 to be recognised is scanned by a photoelectric vonversion device 122 consisting of an image pickup tube or mechanical rotary discs, and is converted into electrical signals whose amplitudes correspond to the intensity of the light at each part of the pattern. These signals undergo sampling by a digital encoder 123 and converted into digital signals in such a manner that "1" is for black and "0" is for white.

The digital signals thus encoded are stored in the memory device 124. The memory device 124 has a plural number, for example N, of shift registers 1241, 1242 . . . 124N. The shift registers 1241, 1242 . . . 124N have memory elements 124*i*1, 124*i*2 . . . 124*i*M of M digits, respectively where M is a positive integer. Hence the memory device 124 consists of N x M memory elements arranged in matrix form. This corresponds to the mesh on the scanning surface of the original pattern. The shift registers 1241, 1242 . . . 124N correspond to the horizontal scanning lines, respectively. The registers 1241, 1242 . . . 124N are connected in series through the gate circuit 1251, 1252 . . . 125N, respectively. The gate circuits 1251, 1252 . . . 125N provide shift pulses, respectively, through a shift-mode switching circuit 126, and with these pulses and signal pulses form an AND gate circuit. Said pattern signals are sent in sequentially from the input side of the shift register 124N of the Nth raw via the gate circuit 125N and passed through the shift registers 124N–1, 124N–2 . . . 1242, 1241 that are connected in series along this order. When the signal reaches the shift register of higher stage, that is the shift register 1241 or 1242 of the first or second line, a first position detector 127 operates and, with its output pulse, drives said shift-type switching circuit 126. The shift pulses to the aforementioned gate circuits 1251, 1252 . . . 125N halt upon the excitation of the circuit 126. Consequently the shift registers 1241, 1242 . . . 124N cut off said series connection and become independent. Hereinafter, the state in which these shift registers 1241, 1242 . . . 124N are connected in series is called the first mode, and the state in which they are independent is called the second mode. The individual digits 124N1, 124N2 . . . 124NM of the shift register 124N of the Nth line are connected, respectively, to the corresponding digits $9_1$, $9_2$ . . . 9M of a shift register 129 that has also M digits through gates 1281, 1282 . . . 128M that are opened for each horizontal scanning. The shift register 129 picks up the signals contained in each horizontal scanning when the pattern signal is sent into the memory device 124, ORs all the horizontal scan signals in one frame scanning, and memorises the result. Therefore, in the memory device 124 is memorised the pattern at the time point when the shift of entire pattern in the first mode is completed. The maximum horizontal width of this pattern appears in the shift register 129. As has been described above, since the shift of the memory device 124 in the first mode is continued until the pattern signals reach the shift register of the uppermost stage, the position of the accumulated pattern is brought near the upper part of the square-form memory device 124. Then the shaft mode is switched to the second mode and the registers 1241, 1242 . . . 124N of the memory device 124 and the shift register 129 start shifting left simultaneously. This second mode of shift ends with the operation of a second detector 130 that detects that the black signal within the shift register 129 has reached the left end. By the shift of the second mode, the pattern in the memory device 24 is brought leftward.

In this way, the pattern in the memory device 124 has been brought near the upper left corner of the square form memory device 124. The size of the pattern thus brought near the upper left corner is detected its size by third and fourth detectors 131 and 132 established on proper positions of the bottom side and right side of the memory device 124. The third detector 131 detects the horizontal width of the pattern and detects the presence or absence of a black signal in the proper part of the shift register 129. The shift register 129 detects the maximum horizontal width. A fourth detector 132 detects the vertical width of the pattern and is provided to detect in a similar manner the presence or absence of black signal in the proper register among the registers 1241, 1242 . . . 124N. In other words, the third and fourth detectors 131 and 132 set the size of the pattern to be normalised depending on their installed positions. When these detectors 131 and 132 have output, in other words, when the pattern stored in the memory device 124 is larger than the predetermined size, a pattern reducing circuit 18 is driven by the output pulse from one of the detectors 131 and 132. When the pattern reducing circuit 132 is driven, the signals stored in the memory device 124 are transferred sequentially to a reducing circuit 133 and a reduced pattern is obtained on the output side of the circuit 133.

The reducing circuit 133 is constructed as shown in FIG. 13. The pattern signals that have to be reduced are sent sequentially from an input terminal 134 to a shift register 1351 that has memory elements equal in number to the number obtained by adding a plural number of digits, for example 2 digits, to M digits that correspond to the horizontal scanning length. The contents of first and last two digits 1351, 1352, (135M+1), (135M+2) of the register 1351 are supplied to a reducing logic circuit 136. The output of the logic circuit 136 is stored in the output register established separately. The operation of the reducing circuit 136 will be explained referring to FIGS. 14A and 14B. FIG. 14A is a typical diagram of the memory device 124 shown in FIG. 12, in which each block expresses a memory element and the 1 in the block means the presence of a black signal.

When the signals stored in the memory device 124 are supplied in sequence to the input terminal 134, the pattern signals of the first two and last two digits 1351, 1352, (135M+1), (135M+2) of the shift register 135 correspond to the signals contained in the square frame F shown in FIG. 14A with bold lines. These signals in the frame F change as the pattern signals move inside the shift register 135. This means that in FIG. 14A that the frame F moves in the meshes and scans it by four blocks. To the reducing logic circuit, the signals contained in the one frame F are applied simultaneously. Let the four signals contained in the frame F be A, B, C and D as shown in FIG. 14B and form the logic circuit 136, so that it performs one of the following logical operations (1) A+B+C
(2) B+C+D
(3) C+D+A
(4) D+B+A
(5) AB+BC+CD+AC+BD+AD Among those logical operations, (1) to (4) reduce the original pattern and produce output when continuous black signals are present in the original pattern. Besides, in some cases, they have a function of connecting a black signal train that is discontinuous at one point. In other words they play the roll of erasing noise. The logical operation (5) produces output only when continuous black signals are present in the original pattern to prevent information needed for character recognition from being lost. The output of the reducing logic circuit 136 that has such functions is constructed so that the output pulse will be memorised by a memory element of a register 137 on the output side of the logic circuit 136 every time the pattern signals shift 2 digits in the shift register 135. Therefore, there is no chance for the signals in the frame F of FIG. 14A to appear repeatedly.

According to the device described so far, the pattern obtained by scanning an original pattern larger in size than the predetermined size is reduced in the form of digital signals to the predetermined size by means of preliminary treatment circuit. This eases the signal processing for pattern recognition that follows and brings an effective result in increasing the pattern recognising capacity of the device.

In the device aforementioned, shift registers have been described to be used as the memory device. The shift registers can be the ones that employ the most common flip-flop circuit or the ones that employ other delay devices.

As the construction of the reducing circuit an area that contains (2 x 2) bits of meshes of the pattern was cut out as one frame. It is not necessary to limit the size of one frame as 2 x 2 bits and a frame of any size can also be used. In this way the reduction of the pattern can be performed in general at an arbitrary reduction rate.

While the invention has been described in connection with some preferred embodiments thereof, the invention is not limited thereto and includes any modifications and alterations which fall within the true spirit and scope of the invention as defined in the appended claims.

What is claimed is:

1. Apparatus for recognising a pattern comprising:

means including quantizing means for converting said pattern to be recognised into mesh patterns;

preliminary treatment means receiving said mesh patterns for detecting the position of the quantised pattern and for segmenting the detected pattern;

means for dividing said preliminarily treated mesh patterns into a plurality of channels;

detecting means coupled to said dividing means and including:

- means for detecting a primary partial characteristic for each of said plurality of channels obtained by said division;
- means responsive to the sequential order of said primary partial characteristics for detecting a secondary partial characteristic; and
- means for relating the secondary partial characteristic of a channel to the secondary partial characteristics of channels preceding and succeeding the channel according to a predetermined relationship for detecting a tertiary partial characteristic in accordance with said relationship;

means for combining the tertiary partial characteristic and the secondary partial characteristic for each channel and for generating a channel characteristic for each channel; and means responsive to the sequential order of said channel characteristics for identifying the pattern to be recognised, the sequential order of said channel characteristics beig indicative of the identity of said pattern to be recognised.

2. Apparatus as claimed in claim 1 wherein said preliminary treatment means further comprises:

means for memorising said segmented mesh patterns;
a read register for receiving a predetermined number of bits from said memory means;
a first register for storing bits corresponding to a partial pattern received by said read register;
a thinned pattern extracting gate coupled to said first shift register for performing a thinning operation on the bits corresponding to said partial pattern stored in said first shift register;
a thinned pattern memory device for memorising the output of said thinner pattern extracting gate;
a second shift register for sequentially shifting the memory contents of said thinned pattern memorising means;
an OR circuit receiving the contents of said second shift register;
a write register receiving and sequentially storing the output of said OR circuit; and
a processed pattern memory device receiving and memorising the output of said write register in sequence, the output of said write register representing thinned and reduced mesh patterns.

3. Apparatus as claimed in claim 1, further comprising means for feeding back a feedback signal from at least one of said primary, secondary, and tertiary partial characteristic detection means to said preliminary treatment means.

4. Apparatus as claimed in claim 1, further comprising means for feeding back a feedback signal from a least one of said primary, secondary, and tertiary partial characteristic detection means to said pattern conversion means.

5. Apparatus as claimed in claim 1 wherein said means for detecting secondary partial characteristics includes:
a primary partial characteristic transition table memory device;
a second read register for reading the contents of said table memory device, said second read register having an answer portion;
an adder circuit for adding the outputs of values of said second read register to said primary partial characteristic;
an address register receiving from said adder circuit a signal designating a call address of a transition table memorised by said table memory device; and
means coupling said secondary partial characteristic signals to said answer portion of said second read register as answers.

6. Apparatus as claimed in claim 1 wherein said means for detecting said channel characteristics of each channel further comprises:
means for obtaining a penalty signal when the detection of the channel characteristics is not performed; and
means for obtaining a signal representing the penalty when the number of the penalty signals exceed a predetermined value, said signal representing said penalty being applied to the pattern conversion means.

7. Apparatus as claimed in claim 1 wherein said means for detecting channel characteristics includes:
a channel characteristic transition table memory device;
a coincidence circuit receiving said secondary and tertiary partial characteristic signals;
a third read register receiving preestablished channel characteristics from said channel characteristic transition table memory device and applying said preestablished channel characteristics to said coincidence circuit; and
an address register receiving an address part of a channel characteristic read from said third read register and designating the address of contents read out from said transition table memory device when the channel characteristic determined by said secondary partial characteristic and tertiary partial characteristic coincides with said channel characteristics.

8. Apparatus as claimed in claim 7 wherein said coincidence circuit further provides an output representing a penalty signal when there is no coincidence between said channel characteristic and the characteristic section of the contents of said third read register, said apparatus further comprising:
a penalty counter for counting said penalty signals;
a minimum detecting device for detecting a predetermined minimum value of the contents of said penalty counter; and
an output circuit for generating a signal representing the penalty when said minimum detecting device detects the minimum value of the contents of said penalty counter.

9. Apparatus as claimed in claim 1 wherein said means for detecting said tertiary partial characteristic comprises:
a first shift register that sequentially memorises values corresponding to primary partial characteristics;
a secondary partial characteristic classifying and coding circuit coupled to said first shift register for classifying and coding values corresponding to primary partial characteristics received from said first shift register;
a counter coupled to said classifying and coding circuit for generating an output "1" only when the output from said classifying and coding circuit counts less than a predetermined continuous number of "1" in the output of said classifying and coding circuit;
a second shift register receiving the output from said classifying and coding circuit when said counter supplies a "1" output;
a third shift register receiving the output from said second shift register sequentially;
an OR circuit for generating the logical sum of the outputs of the final three stage registers of said second shift register; and
an AND circuit for generating the logical product of the output of said OR circuit and the output of the second to final stage registers of said third shift register.

10. Apparatus as claimed in claim 1 wherein said preliminary treatment circuit comprises:
a plurality of shift registers connected to each other through a shift mode changing gate circuit, coded pattern signals being applied sequentially to said plurality of shift registers;
a plurality of detection circuits that detect the presence or absence of pattern signal at a specified position of said plurality of registers;
a shift mode switching circuit driven by the output from at least one circuit of said plurality of detection circuits for selectively opening and closing said gate circuits; and
a reducing circuit for receiving and reducing pattern signals memorised in said plurality of shift registers. said shift mode switching circuit being operated by the output of at least one detection circuit other than said plurality of detection circuits.

11. Apparatus as claimed in claim 2 wherein said means for detecting said primary partial characteristic comprises:
a fourth read register receiving the contents of said processed pattern memory device;
a channel shift register for sequentially receiving and storing signals for each channel from said fourth read register; and
a primary partial characteristic detecting gate circuit receiving the output of said channel shift register for detecting the primary partial characteristic from a partial mesh pattern received from said channel shift register.

12. Apparatus as claimed in claim 10 wherein said reducing circuit comprises:
a reducing circuit shift register having stages equal in number to the number of stages corresponding to horizontal scanning length plus a predetermined number of stages;

a reducing logic circuit for adding the contents of a predetermined number of the initial and final stages of said reducing circuit shift register; and an output register for storing the output of said reducing logic circuit.

References Cited

UNITED STATES PATENTS

| | | | |
|---|---|---|---|
| 3,111,646 | 11/1963 | Harmon | 340—146.3 |
| 3,268,864 | 8/1966 | Kubo et al. | 340—146.3 |
| 3,293,604 | 12/1966 | Klein et al. | 340—146.3 |

THOMAS A. ROBINSON, Primary Examiner